United States Patent
Tse et al.

(10) Patent No.: US 12,488,254 B2
(45) Date of Patent: *Dec. 2, 2025

(54) RULE INDUCTION TO FIND AND DESCRIBE PATTERNS IN DATA

(71) Applicant: Microsoft Technology Licensing, LLC, Redmond, WA (US)

(72) Inventors: Edmund Chi Man Tse, Seattle, WA (US); Brett Owens Simons, Woodinville, WA (US); Sandeep Repaka, Issaquah, WA (US); Yatpang Cheung, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/189,784

(22) Filed: Mar. 24, 2023

(65) Prior Publication Data
US 2023/0229941 A1  Jul. 20, 2023

Related U.S. Application Data

(63) Continuation of application No. 16/443,859, filed on Jun. 17, 2019, now Pat. No. 11,640,543.

(51) Int. Cl.
*G06N 5/025* (2023.01)
*G06F 18/2113* (2023.01)
(Continued)

(52) U.S. Cl.
CPC ......... *G06N 5/025* (2013.01); *G06F 18/2113* (2023.01); *G06F 18/214* (2023.01);
(Continued)

(58) Field of Classification Search
CPC ........ G06N 5/025; G06N 20/20; G06N 5/003; G06N 5/01; G06K 9/623; G06K 9/6256;
(Continued)

(56) References Cited

U.S. PATENT DOCUMENTS

2002/0169736 A1* 11/2002 Howard ................. G06K 9/626
706/20

OTHER PUBLICATIONS

Provost, F. and Kolluri, V., 1999. A survey of methods for scaling up inductive algorithms. Data mining and knowledge discovery, 3(2), pp. 131-169.*

(Continued)

*Primary Examiner* — Zhitong Chen (57) ABSTRACT

Rule induction is used to produce human readable descriptions of patterns within a dataset. A rule induction algorithm or classifier is a type supervised machine learning classification algorithm. A rule induction classifier is trained, which involves using labelled examples in the dataset to produce a set of rules. Rather than using the rules/classifier to make predictions on new unlabeled samples, the training of the rule induction model outputs human-readable descriptions of patterns (rules) within the dataset that gave rise to the rules (rather than using the rules to predict new unlabeled samples). Parameters of the rule induction algorithm are tuned to favor simple and understandable rules, instead of only tuning for predictive accuracy. The learned set of rules are outputted during the training process in a human-friendly format.

20 Claims, 11 Drawing Sheets

(51) Int. Cl.
  *G06F 18/214*  (2023.01)
  *G06F 18/24*  (2023.01)
  *G06N 5/01*  (2023.01)
  *G06N 20/20*  (2019.01)

(52) U.S. Cl.
  CPC ......... *G06F 18/24765* (2023.01); *G06N 5/01* (2023.01); *G06N 20/20* (2019.01)

(58) Field of Classification Search
  CPC ... G06K 9/626; G06F 18/2113; G06F 18/214; G06F 18/24765
  See application file for complete search history.

(56) References Cited

OTHER PUBLICATIONS

Thabtah, F., Qabajeh, I. and Chiclana, F., 2016. Constrained dynamic rule induction learning. Expert Systems with Applications, 63, pp. 74-85.*
Nguyen, D.D., 2003. Using Prior Knowledge in Rule Induction.*
PRIMER-A Regression-Rule Learning System for Intervention Optimization. In Rule Technologies. Research, Tools, and Applications: 10th International Symposium, RuleML 2016, Stony Brook, NY, USA, Jul. 6-9, 2016. Proceedings 10 (pp. 307-321). Springer International Publishing.*

* cited by examiner

RULE INDUCTION grow rules using a separate-and-conquer approach and a brute force search strategy (exhaustive search):
- for each target class, find all combinations of conditions that cover that target class while increasing examples covered and accuracy too many combinations to try, NP-Hard

| WEATHER | SEASON | LOCATION | HIKING |
|---------|--------|----------|--------|
| sunny | summer | seattle | yes |
| cloudy | winter | NY | no |
| rainy | winter | miami | no |
| sunny | winter | seattle | no |
| cloudy | summer | NY | yes |
| rainy | summer | atlanta | no |
| rainy | summer | seattle | no |
| sunny | summer | atlanta | yes |
| sunny | summer | ny | yes |
| cloudy | summer | atlanta | yes |

102

⇩

ALL DISTINCT VALUES:
sunny, cloudy, rainy;
summery, winter;
seattle, NY, miama;
atlanta;

130

132

⇩

FOR TARGET VALUE: HIKING==yes

| CONDITIONS | COVERED |
|------------|---------|
| sunny | 3/4 |
| sunny, summer | 3/3 |
| sunny, seattle | 1/2 |
| sunny, summer, seattle | 1/1 |
| sunny, summer, ny | 1/1 |
| (all possible combinations ...) | ... |

Separate-and-Conquer + Greedy Heuristic + Beam Search Algorithm

• For each target, instead of exhaustively testing all combinations, keep K best conditions first,
then for each of those conditions, add possible conditions and again keep the K best conditions
found. Repeat until no more conditions can be added.

• At the end, we will have K rules from the current search. The best rule found during the search
will be the rule generated for the current search.

After generating a rule from a search, remove instances covered by that rule and continue searching for more rules for the current target This ensures that the dataset "shrinks" and algorithm is working towards a base/stopping case

FIG. 4

| WEATHER | SEASON | LOCATION | HIKING |
|---|---|---|---|
| sunny | summer | seattle | yes |
| cloudy | winter | NY | no |
| rainy | winter | miami | no |
| sunny | winter | seattle | no |
| cloudy | summer | NY | yes |
| rainy | summer | atlanta | no |
| rainy | summer | seattle | no |
| sunny | summer | atlanta | yes |
| sunny | summer | NY | yes |
| cloudy | summer | atlanta | yes |

102

140 — Let K = 2 and for target value: hiking==yes!

142

| CONDITIONS | COVERED |
|---|---|
| sunny | 3/4 |
| cloudy | 2/3 |
| rainy | 0/3 |
| summer | 5/7 |
| winter | 0/3 |
| seattle | 1/3 |
| NY | 2/3 |
| miami | 0/1 |
| atlanta | 2/3 |

| WEATHER | SEASON | LOCATION | HIKING |
|---|---|---|---|
| sunny | summer | seattle | yes |
| cloudy | winter | NY | no |
| rainy | winter | miami | no |
| sunny | winter | seattle | no |
| cloudy | summer | NY | yes |
| rainy | summer | atlanta | no |
| rainy | summer | seattle | no |
| sunny | summer | atlanta | yes |
| sunny | summer | ny | yes |
| cloudy | summer | atlanta | yes |

102

160 — AFTER GENERATING A RULE, REMOVE INSTANCES COVERED BY THAT RULE, RESULTING IN THIS DATASET

102A

| WEATHER | SEASON | LOCATION | HIKING |
|---|---|---|---|
| cloudy | winter | NY | no |
| rainy | winter | miami | no |
| sunny | winter | seattle | no |
| cloudy | summer | NY | yes |
| rainy | summer | atlanta | no |
| rainy | summer | seattle | no |
| cloudy | summer | atlanta | yes |

162 — NOW SEARCH AGAIN UNTIL ALL TARGET INSTANCES (hiking==YES) ARE COVERED, WHICH GETS THE NEXT BEST RULE:

164 — IF cloudy AND summer -> hiking==YES

FIG. 8

MODIFIED CN2 ALGORITHM

170

- Algorithm:
    - For each target class:
        - While target instances remain :
            - Generate a new rule
            - Remove instances covered by new rule
- Generate a new rule:
    - Keep a beam of K best rules so far
    - While beam is not empty:
        - For each rule in beam:
            - From dataset covered by that rule, compute all possible distinct conditions (selectors)
            - Add each condition/selector to rule, thus creating a new rule for each selector
            - Compute each new rule's accuracy and statistical significance
            - Add rules to temporary buffer
    - Pick K best rules from buffer and place in beam
        - Return best rule found during search

FIG. 11

RULE INDUCTION TO FIND AND DESCRIBE PATTERNS IN DATA

CROSS-REFERENCE TO RELATED APPLICATIONS

This application is a continuation of U.S. patent application Ser. No. 16/443,859 filed on Jun. 17, 2019, entitled "Rule Induction to find and Describe Patterns in Data", which is incorporated herein by reference in its entirety. To the extent appropriate a claim of priority is made to the application.

BACKGROUND

For many reasons, the computing systems are generating ever-increasing amounts of data. An entity's computing systems may accumulate digital information that is vast in its quantity and complexity. Naturally, despite their size, it is desirable to analyze large dataset to gain insights and find hidden properties of the dataset.

One kind of data that tends to be large and highly dimensional is diagnostic information gathered from computing devices. Modern connected devices commonly report diagnostics to a collection service. Such telemetry data may include operating system crash data, application trace logs, bug reports, and so on. The collection service may stitch this disparate data into a coherent dataset with perhaps hundreds of columns or dimensions and trillions of individual records. Diagnostic data is often mined for purposes such as identifying causes of bugs, sources of performance problems, or other software qualities. This has involved a somewhat manual workflow of sifting through combinations of data to identify patterns in the data. For instance the FP-Growth and Power BI software tools have been used for fast pivoting of data, filtering, and generating reports.

Although the manual approach to exploring diagnostic datasets has worked in some ways, the traditional datamining workflow is slow and prone to missing important information. Consider a typical approach, which is to formulate a measure of some quality or property of a component being investigated, for instance a reliability score. To improve this score, because it is easy and straightforward, investigation may begin with the largest group of records or samples that have at least a moderate contribution to the quality score. However, this approach often fails to uncover subsets of data that are too small to notice but which have disproportionate impact on the score. There are other shortcomings with the pivot-and-explore approach to finding important patterns and subsets in a dataset. For instance, the number of dimensions in the dataset may be too large to practically explore and scale to many different measures.

Regardless of the data or the purpose for finding significant subsets, it can be convenient for subsets of a dataset to be expressed as rules defined in terms of properties of fields in the dataset and relationships between the fields. Discussed below are techniques for using machine learning rule induction to discover rules that define significant subsets in a dataset.

SUMMARY

The following summary is included only to introduce some concepts discussed in the Detailed Description below. This summary is not comprehensive and is not intended to delineate the scope of the claimed subject matter, which is set forth by the claims presented at the end.

Rule induction is used to produce human readable descriptions of patterns within a dataset. A rule induction algorithm or classifier is a type supervised machine learning classification algorithm. A rule induction classifier is trained, which involves using labelled examples in the dataset to produce a set of rules. Rather than using the rules/classifier to make predictions on new unlabeled samples, the training of the rule induction model outputs human-readable descriptions of patterns (rules) within the dataset that gave rise to the rules (rather than using the rules to predict new unlabeled samples). Parameters of the rule induction algorithm are tuned to favor simple and understandable rules, instead of only tuning for predictive accuracy. The learned set of rules are outputted during the training process in a human-friendly format.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments described below facilitate discovery of rules about a dataset. Embodiments include an algorithm that will indicate where to start looking in the data and find important rules rather than having to manually pivot and explore to find rules that only define the largest segments of interest. Rather than starting from a global view of the relevant dataset, all of the data is passed in and the algorithm will discover and prioritize, in the form of rules, segments of the dataset. If prioritized, the rules can provide visibility to both large segments as well as those that are not large (or even small) but are important.

Figure 1:
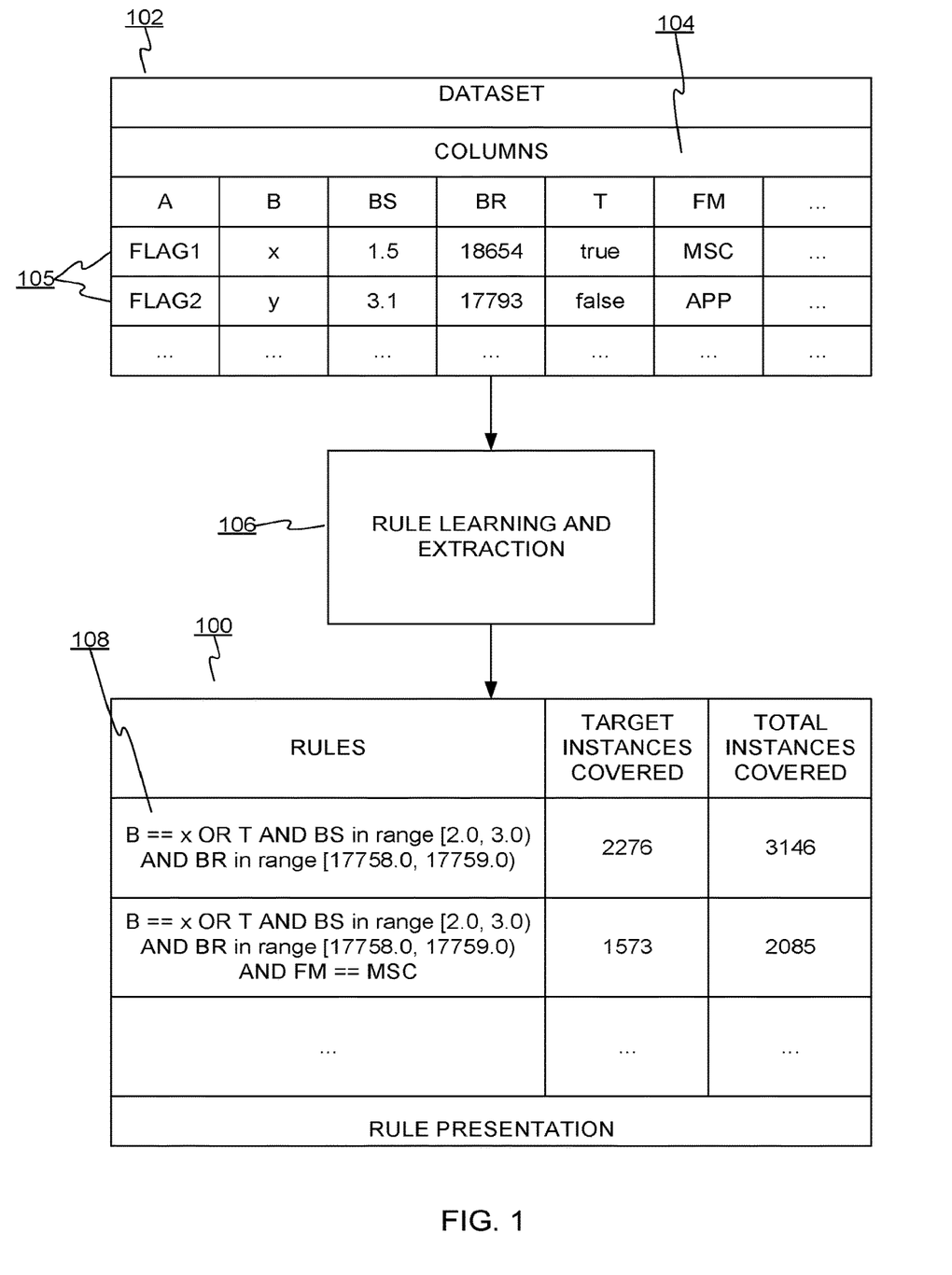
FIG. 1 shows an example of inferring rules from a dataset.

FIG. 1 shows an example of inferring rules 100 from a dataset 102. The dataset 102 may be any structured set of multi-dimensional data. For discussion, the dataset 102 will be assumed to have multiple columns 104 and rows or records 105 that each consist of values for the respective columns (rows that match a rule will sometimes be referred to as instances). A rule learning module 106 includes an algorithm that processes the dataset 102 based on user-defined objectives, goes through all of the dimensions and combinations of dimensions to segment the dataset as needed, and uses machine learning to infer the rules 100 about the dataset 102. In most cases, the rule learning module 106 seeks rules that satisfy some initial constraint on the dataset, for example, a specified value for a particular column. Such a constrained target dataset is the subset of the overall dataset 102 that satisfies the target constraint. For example, if a target column set to be "A==FLAG1" then the target dataset is all rows where column A has a value of FLAG1.

Each rule 108 in the rules 100 defines a subset of the target dataset. A rule's coverage can be evaluated as the number of instances it covers over the total number of instances of rows in the target dataset. Each rule is a Boolean expression tree, possibly complex, where some elements may be operators or functions that test values of columns and output Boolean values (e.g., numeric comparators). See the examples in FIG. 1. Such a rule defines a subset of the target dataset; all rows having that satisfy the selectors of the rule are said to be the rows that the rule covers. Each rule has a coverage ratio, which is the ratio of rows that satisfy the rule over the number of rows in the target dataset.

As discussed in the Background, it has been possible to discover rules in a dataset by manually using various tools to manually explore data, test conditions and pivots, etc. However, these processes tend to find the rules that have large coverage in the target data. Rules with small coverage can be difficult to discover, which can be problematic for rules that cover instances of particular import. A machine learning approach to automate rule discovery can be helpful for both efficiency and completeness. To understand the process for inferring rules, consider how decision trees model rules.

Figure 2:
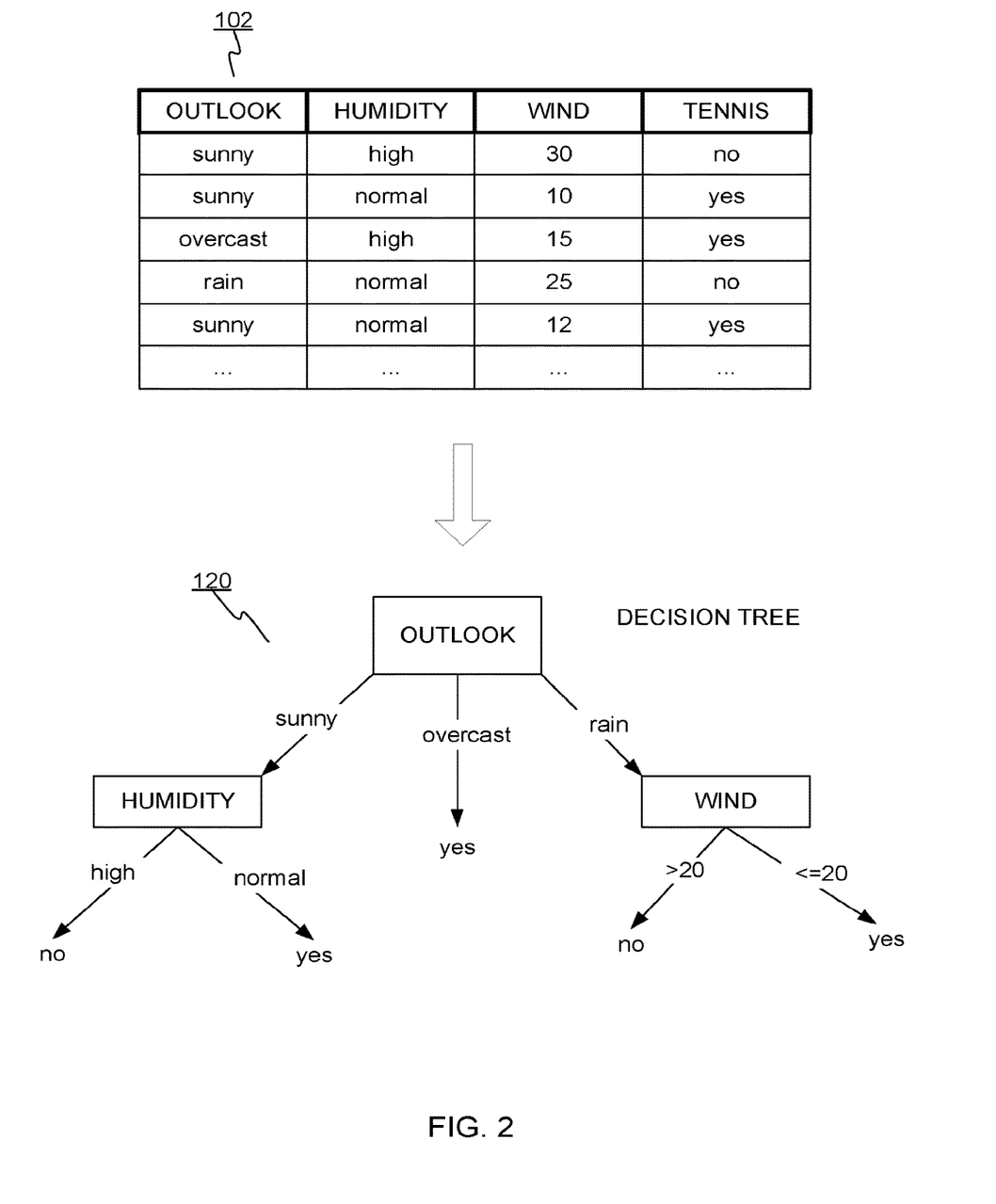
FIG. 2 shows an example dataset and a decision tree.

FIG. 2 shows an example dataset 102 and a decision tree 120. A decision tree is a way to structure data to gain insights. A decision tree represents possible decisions at the nodes and outcomes at the leaves. A decision tree represents what is known in the target data, and paths through the tree represent rules that cover different segments of the data. In the example shown in FIG. 2, the leaves/outcomes are all answers to the question "play tennis?", traversing from the root node ("OUTLOOK") to a leaf node with the desired value. One rule would be: "if the Outlook is Sunny and the Humidity is Normal→yes to tennis". This kind of rule is not readily apparent from looking at the tabular input data.

A problem is how to transform the tabular structure of the input dataset to the logical structure of a decision tree, which in turn can be used to understand the dataset in terms of rules. So the decision tree can be a building block for understanding the inferring of rules from large datasets. While decision trees are helpful for understanding the following rule-inferring algorithms, decisions trees are not necessarily generated by the algorithms discussed herein. In practical applications, decision trees can become complex and even cryptic, and the rules derived from them can be difficult for humans to comprehend. Moreover, decision trees use a divide-and-conquer search algorithm. Because the data is to be optimized for all target values (e.g., different sports for a "sports" column) for all outcomes, it becomes less desirable for generating rules. A better approach is to use a separate-and-conquer algorithm that learns rules for each target value (e.g., "football" and "soccer") at a time, which allows optimization for specific target values. The reason is that a rule's conditions explain one target value; for better rules it might not make sense to optimize on every target value at once.

Figure 3:
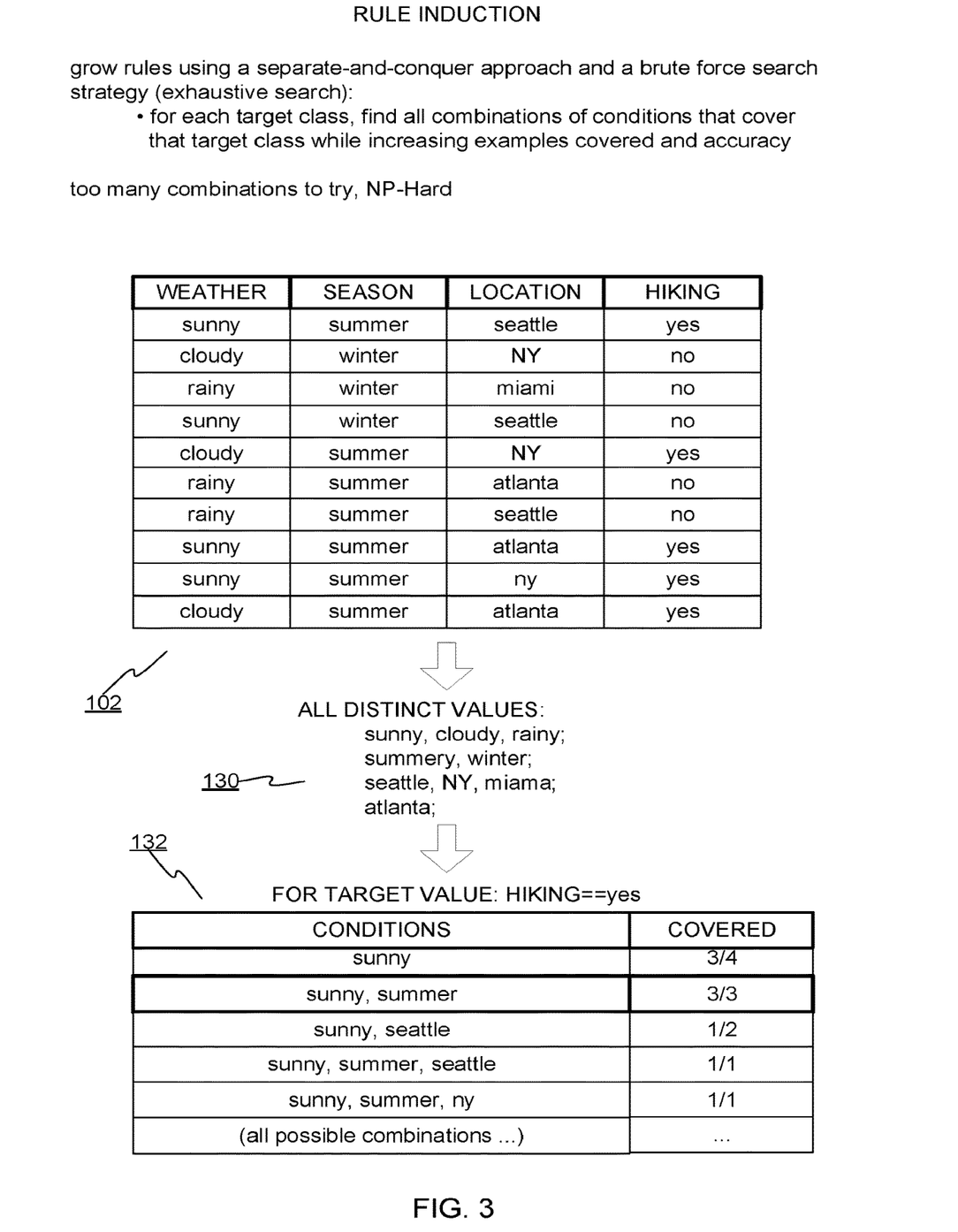
FIG. 3 shows an example of rule induction using a separate-and-conquer algorithm and a brute force search.

FIG. 3 shows an example of rule induction using a separate-and-conquer algorithm and a brute force search. The most trivial approach is to compute all the distinct values 130, and then find rules 132 for all of the combinations 130 of the distinct values. The coverage ratios indicate the accuracy of each set of distinct values. But, as can be seen, since this approach uses all combinations, the algorithm is O(N!), which is an NP-hard problem.

Figure 4:
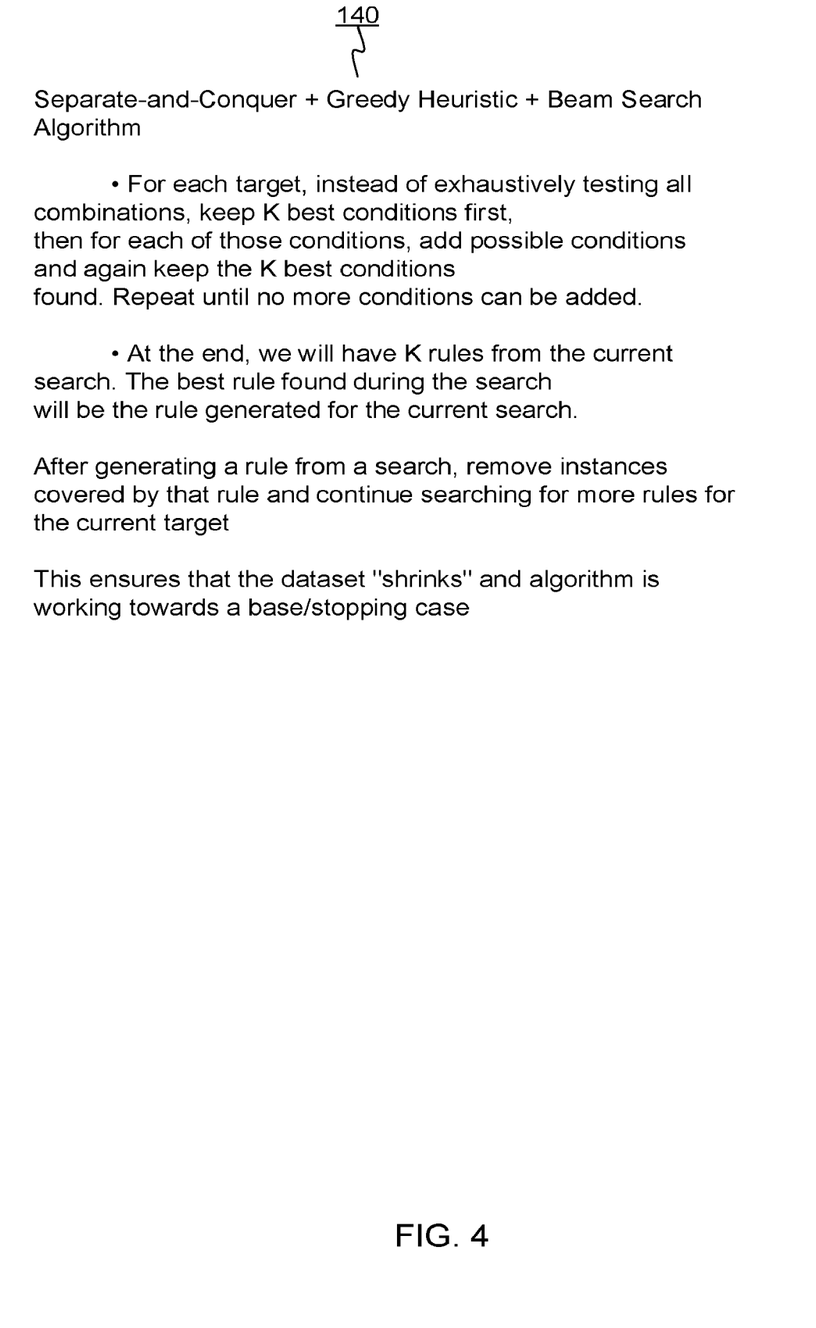
FIG. 4 shows rule induction improvements that combine aspects of a separate-and-conquer approach, a greedy heuristic, and a beam search algorithm.

FIG. 4 shows rule induction improvements 140 that combine aspects of a separate-and-conquer approach, a greedy heuristic, and a beam search algorithm. As noted above, an exhaustive search strategy of considering all possible combinations is prohibitive. One way to improve the algorithm is to incorporate more layers on top and add more algorithms such as a greedy heuristic and beam search. Instead of exhaustively testing all combinations, at each layer in the growth tree the K best conditions (on columns) at a time, which is the greedy aspect. The beam search is keeping only the fixed size of K-best at each layer of the growth tree; because the tree structure is growing recursively, if thought of as a level-order traversal, every level has a maximum width of K. To summarize, the K-best are kept at each iteration, and K is a fixed size. At the end of a rule search the search tree has K leaf nodes, i.e., K rules, and the best rule will be the rule for the current search. Looking ahead, because the search is recursive, a stopping case is needed. By removing instances covered by a found rule, the target dataset continues to shrink until empty, which is when the recursion stops.

Note that a condition mentioned above specifies a value for one column. While a basic rule induction algorithm enumerates all possible combinations of these conditions for all columns to find the best combination of conditions overall, a greedy algorithm searches for the best combination by building it up one condition at a time, enumerating all single conditions for each column and then discarding all but the best one. The next condition is appended to the partial combination by repeating the previous step, and this process continues until no more conditions can be added. A beam search is similar to the greedy algorithm, but instead of choosing only the single best condition, it chooses K best partial combinations so far and discards the rest. While a greedy search results in the single best combination of conditions to form a rule, a beam search results in the K best rules.

Figure 5:
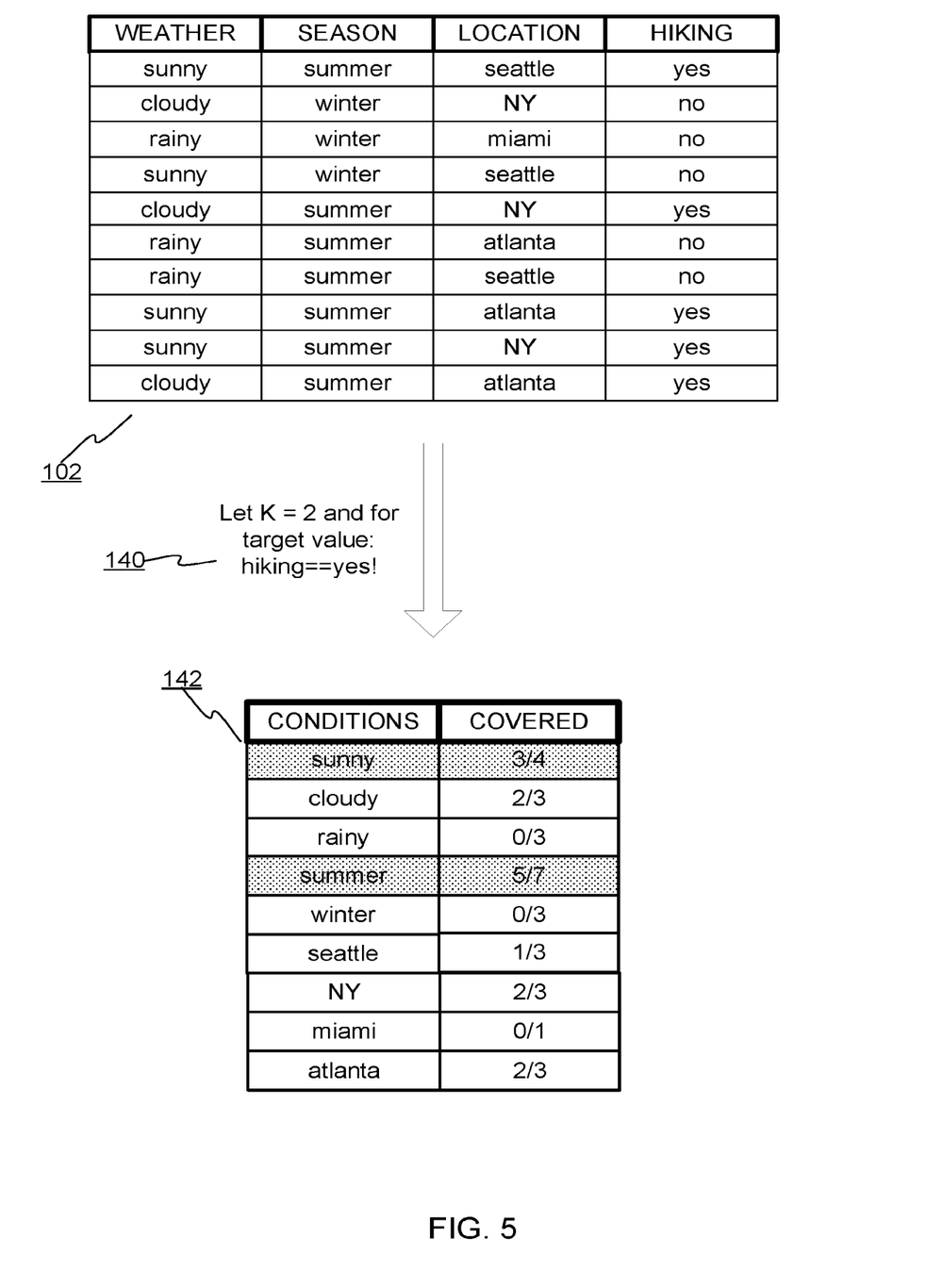
FIG. 5 shows an improved search algorithm as applied to the example shown in FIG. 3.
Figure 6:
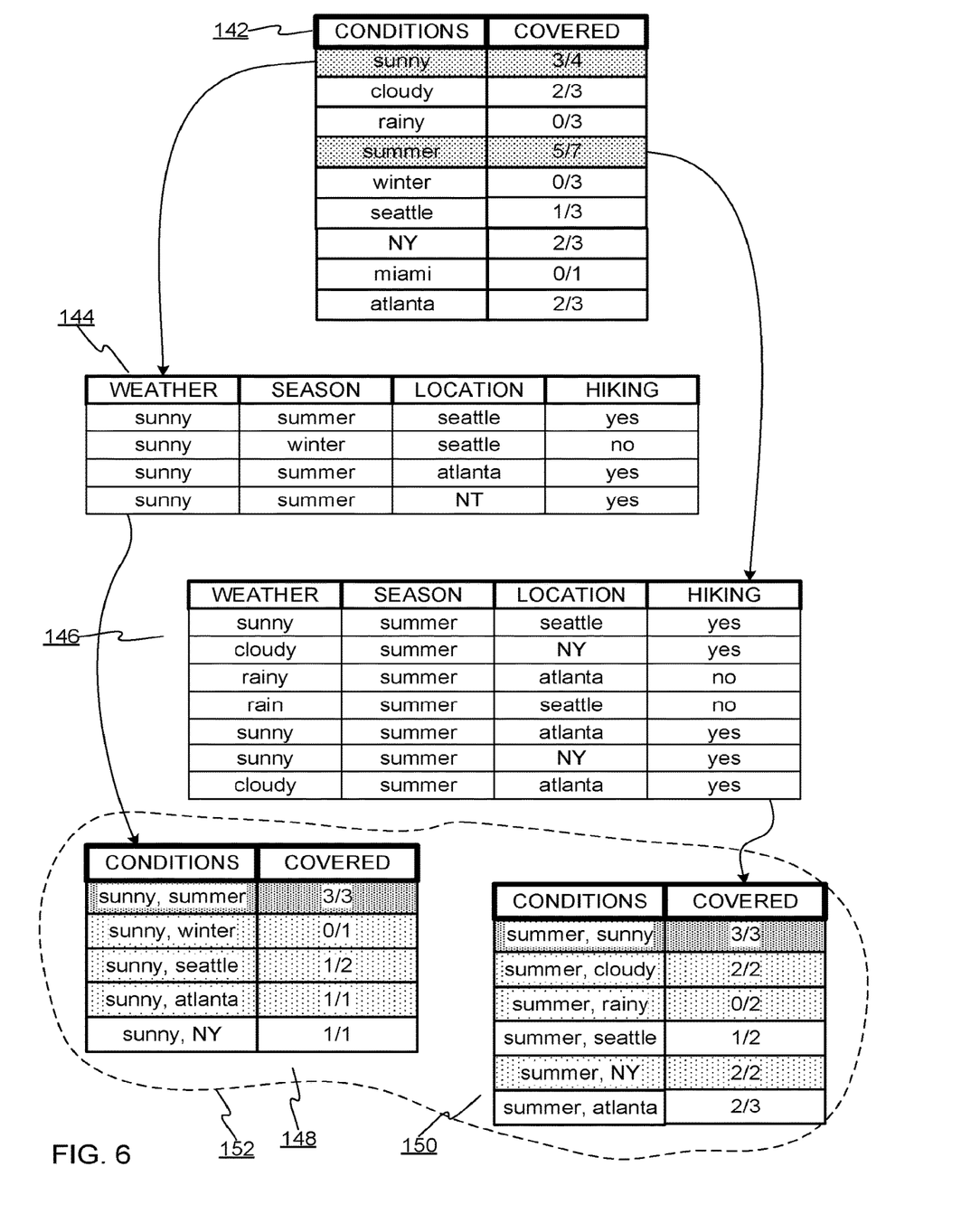
FIG. 6 continues the example of FIG. 5.

FIG. 5 shows an improved search algorithm as applied to the example shown in FIG. 3. The algorithm starts out with a target value of "yes" to "hiking", and with a beam size 140 of K=2. First, all of the distinct values 142 are computed, which is the first pass, and the coverage of each distinct value is computed. FIG. 6 continues the example. Because K=2, the two best conditions are selected (shaded). A search is done for each of those conditions. For the first condition, "weather=sunny", the dataset is shrunk to first rows 144 that are "true". Second rows 146 are isolated for the second condition of "season=summer". Coverage ratios (accuracies) of the combined conditions 152 (first conditions 148 and second conditions 150) are computed.

Figure 7:
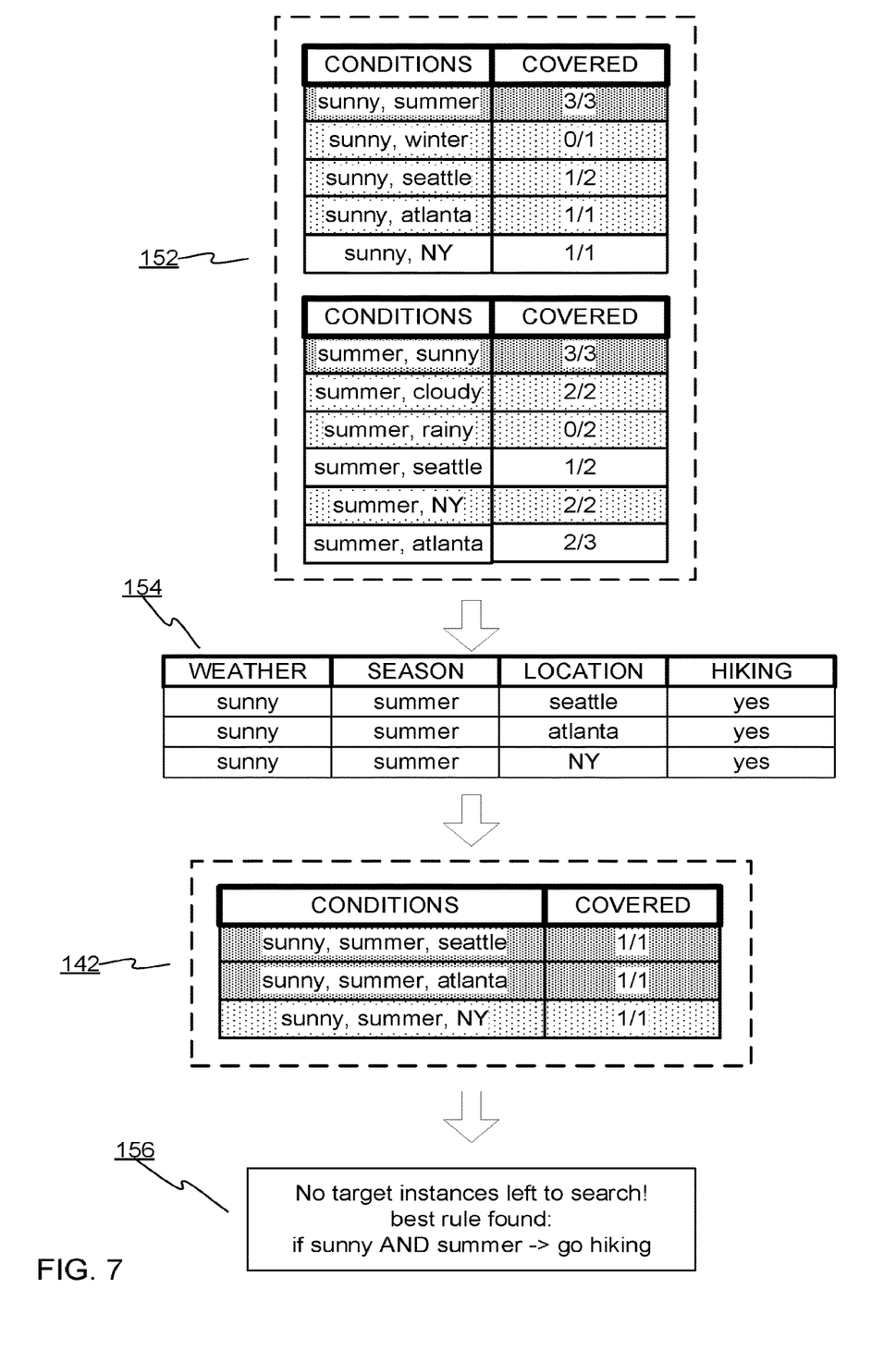
FIG. 7 shows the greedy search performed on combined conditions.

As shown in FIG. 7, the process repeats (recurses). Greedily, the most accurate K=2 conditions (rules) are selected from the combined conditions 152 ("sunny,summer", and "summer,sunny").

FIG. 7 shows the greedy search performed on the combined conditions 152. A shrunken dataset 154 is found for the two conditions. New distinct values are taken from the shrunken dataset 154 and are added to the distinct values 142. Coverages for the new distinct values 142 are recalculated. When the search considers another recursion at step 156 it finds that there are no target instances left to search and the best found rule can be easily identified, i.e., "if sunny AND summer→go hiking". Best can be defined in terms of accuracy and/or coverage, but any criteria may be used.

Figure 8:
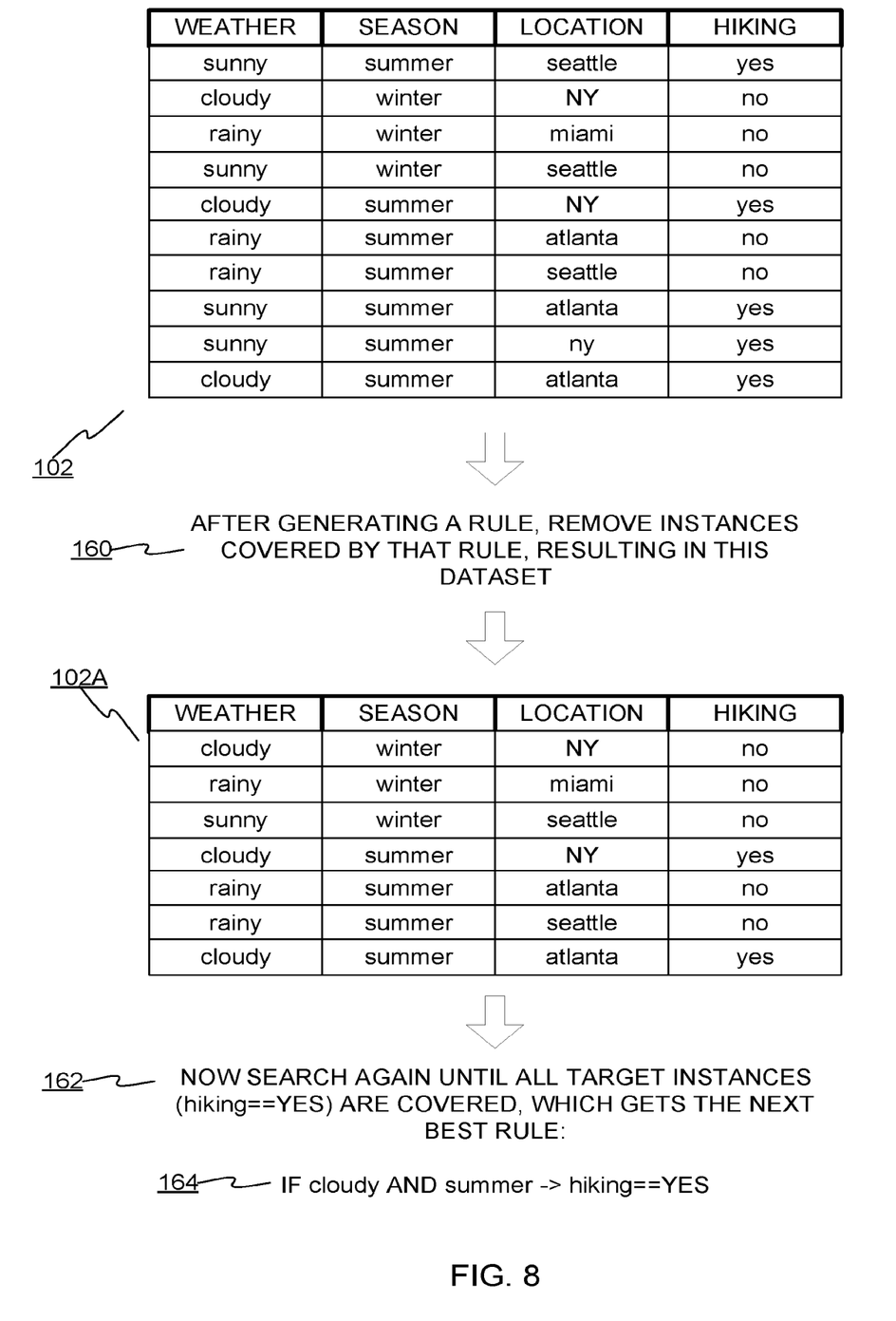
FIG. 8 shows continuation of the search after generating a rule and separating out the data of the generated rule.

FIG. 8 shows continuation of the search after generating a rule and separating out the data of the generated rule. At step 160, the rule generated in the first pass is applied to the original dataset to remove covered rows where "hiking=yes". Rows with "weather=sunny" and "season=summer" are removed, resulting in a reduced dataset 102A. At step 162 the recursive search is performed again on the reduced dataset 102A, producing the best rule 164 for the reduced dataset 102A. The best rule 164 also happens to reduce the target dataset to empty, which concludes the search.

The value of K=2 is arbitrary. Any value can be used, depending on available resources. The value for K, or the beam width, dictates how greedy the search will be.

Figure 9:
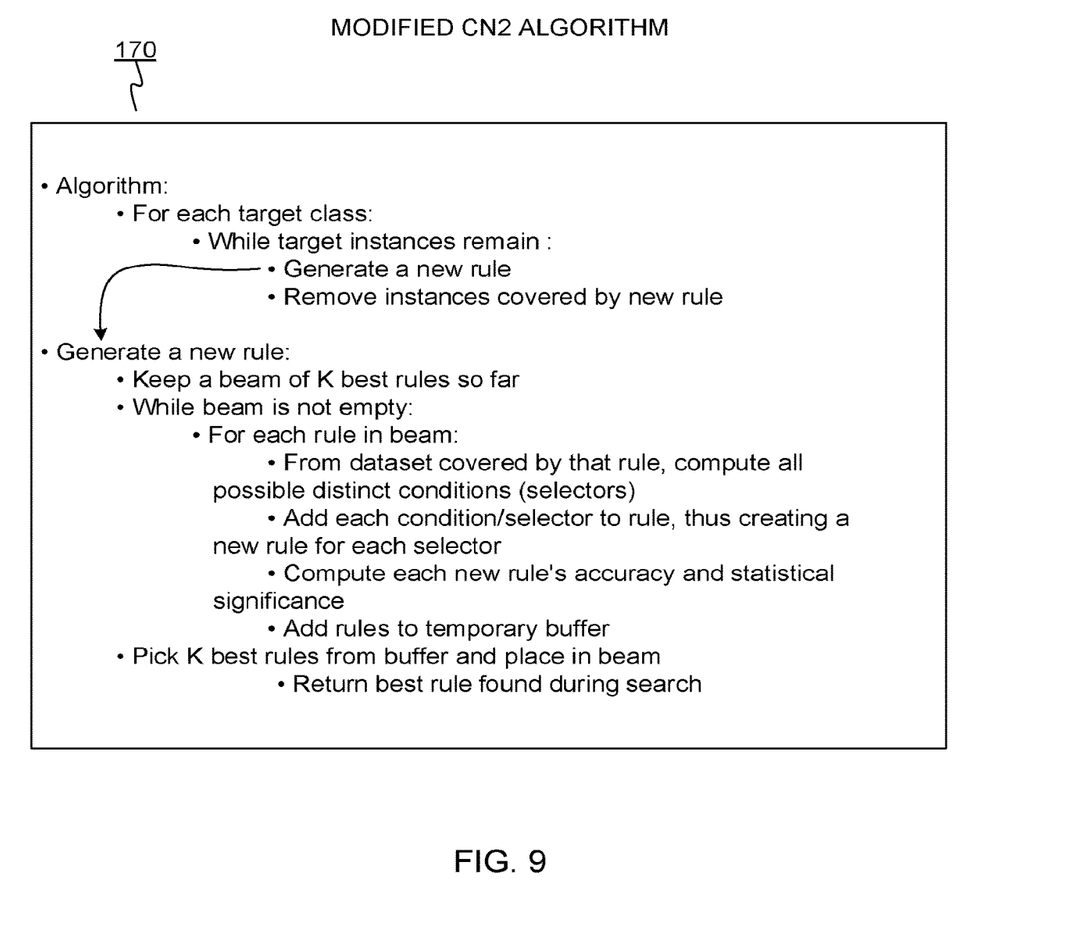
FIG. 9 shows an overview of a search algorithm.

FIG. 9 shows an overview of the search algorithm 170. The algorithm can be thought of as a modification of the CN2 rule induction algorithm. The main loop iterates over each class in the target column. The main loop includes a search loop that keeps finding new rules and reducing the target dataset for the current target class until it is empty. Notably, when a rule is generated, instances of the rule are removed before performing another search. Although a decision tree and a modified CN2 algorithm both shrink the data during a search, the modified CN2 algorithm uses divide-and-separation, so, although the dataset is shrinking, the rule is grown by repeatedly calculating and optimizing for a specific target value (as calculated by accuracy), whereas a decision tree algorithm will try to optimize for all of the target values in the dataset at once, which can be done with entropy or information gain.

The search algorithm can be improved in other ways. Although accuracy can be calculated in a straightforward manner as discussed above, the Laplace Accuracy may produce better rules: Laplace Accuracy=$(N_{target}+1)/(N_{total\ covered}+2)$, where N is the number of instances covered by a rule.

A statistical significance test can also be added for improvement. Consider a rule being generated that already has some conditions (e.g., three). There is a question of whether to add another condition to the rule, and how is that decided. Given a rule with some conditions, the statistical is a calculation of the expected ratio of instances that would be seen for a target versus a non-target. If the new candidate condition matches what is expected then it means the new candidate condition did not add any value. On the other hand, if its results are unexpected then the extra condition offers something new, so the condition is added to the rule. This modification can help make rules shorter and more understandable. One measure is a Likelihood Ratio Statistic, which can be $$2\sum_{i=1}^{n} f_i \log\left(\frac{f_i}{e_i}\right),$$

where $F=(f_1, \ldots, f_n)$ represents the set of observed frequency distribution and $E=(e_1, \ldots, e_n)$ represents the set of expected frequency distribution.

Performance of the modified CN2 algorithm can be optimized in several ways, potentially improving performance by an order of magnitude. For example, it may not be necessary to explain or cover every target instance. Explaining say 90% of the target instances might be sufficient. So having a cutoff at which some ratio of instances have been explained can be helpful. Also, during the rule search, it may be possible to stop searching if no good new rules are being found. In addition, a limit on the maximum number of selectors can also be used, which can avoid runaway rules and improve performance.

Regarding performance, the estimated performance will be proportional to (Rows*Columns+Number of Distinct Values)* Number of Rules. But, because the number of distinct values is always less than the number of Rows*Columns, the runtime performance reduces to (Rows*Columns)*Number of Rules.

There are also some implementation choices that can improve performance. Consider the search of the dataset. Because of reduction and recursion, the current working dataset changes frequently. Thus, implementing efficiently keeping track of which instances are covered can help performance by avoiding unnecessary searches. Using an array for this purpose may take advantage of spatial locality. Furthermore, because separate-and-conquer is being used, it makes sense to let the searches for each respective target value run in parallel. Also, the counts can be computed at one time with a single pass through the data. Column-wise parallelization can also be implemented because every column is separate when it comes to computing distinct values. Since it is convenient to use hashes to compare distinct values, the data can be pre-processed and indexed. Because much of the data is likely to be categorical, an indexer can be used to set upper and lower bounds on the value ranges, which can be used to directly access memory in an array instead of a hash table. This can significantly reduce the overhead of hashing.

Figure 10:
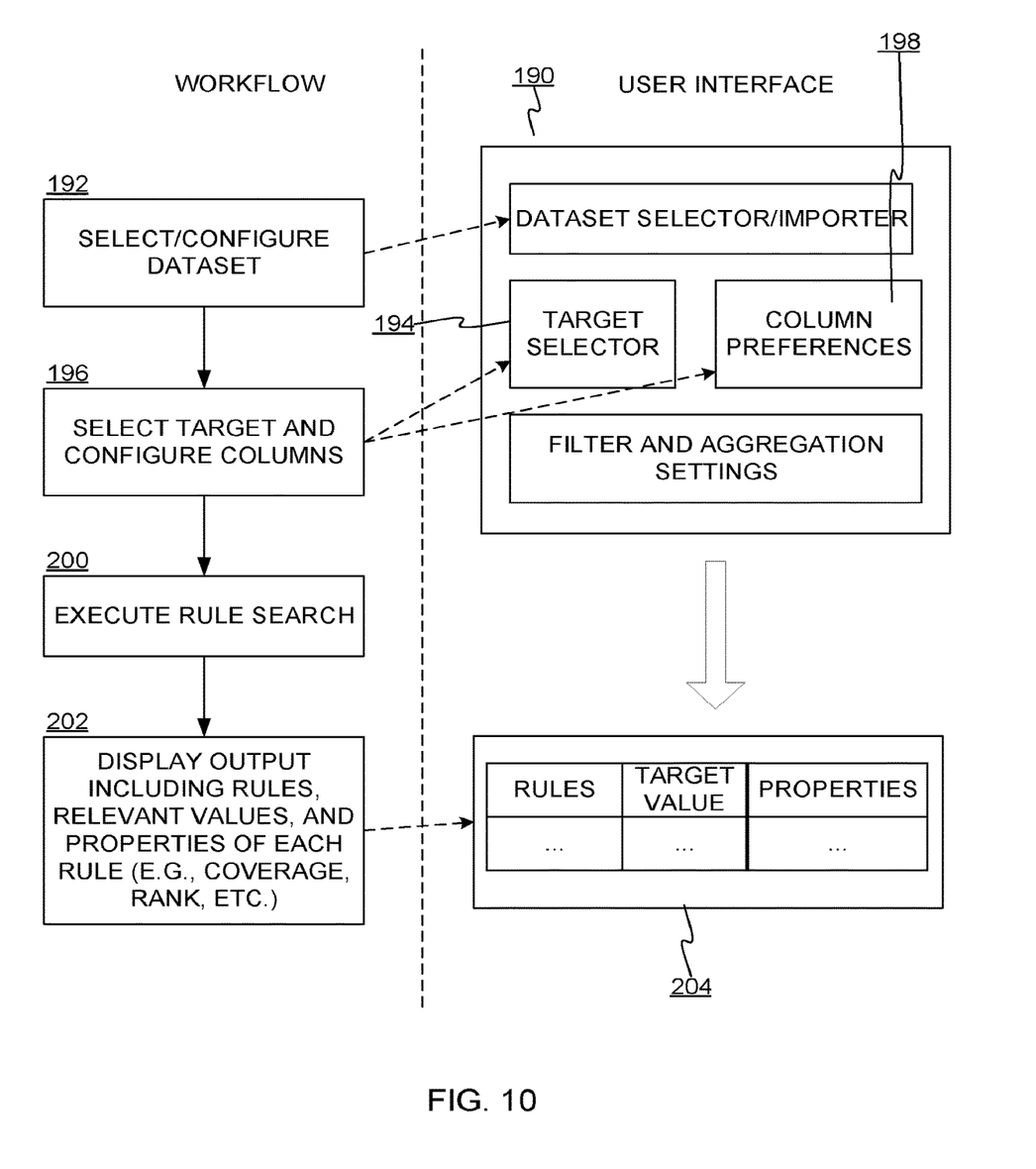
FIG. 10 shows a workflow using a rule learning module.

FIG. 10 shows a workflow using the rule learning module 106. The embodiments described above can be implemented on any computer. It can be convenient to use a cloud and to implement the rule learning module 106 as a cloud service. A properly selected cloud may provide components for storing datasets and outputs (e.g., a storage service), importing datasets, cleaning datasets, and so forth. A user interface 190 can be implemented as a web frontend.

Naturally, the workflow begins at step 192 with a user selecting and configuring the dataset 102. A schema may be imported or automatically generated by analyzing the data. A column selector 194 is used at step 196 to select the target column for which rule prediction is desired. A column preferences 198 user interface element can be used to flag columns for differentiation as either (i) important for differentiation, (ii) having importance decided by the algorithm, or (iii) not considered. Note that "important" may be determined by Apache Spark's™ Chi-Squared test of independence to determine if there is a correlation between the input column and the target column. The higher the correlation, the more important the column is considered so the more likely it will be used during the rule induction step. Note also that if a column has numerical values, the values can be converted to categories by using ranges/bins as categories. A column can be flagged as a count column, which is a column containing row aggregation values (i.e., how many instances a row represents). Rows can be weighted during the search according to their respective counts. Ordinary filters can also be specified to have only a desired subset of the dataset be processed to infer rules.

At step 200 a rule search is executed. The rule search is performed as per any of the embodiments described above. At step 202 the rule learning module 106 outputs a presentation 204 of rules inferred from the target data. The presentation 202 may be in the form of a graphic screen, a file, a hardcopy, etc. The presentation 204 may also include information about the relevances or priorities of the rules, possibly based on their coverages or other properties of the rules (see next paragraph). A typical presentation output will include a set of rules (each made up of selectors) and possibly: the target column, target value, target count, total count, and accuracy score. Each rule will generally be in the form of text. Each rule will comprise or correspond to a rule antecedent (if) and a corresponding rule consequent (then). The rule consequent need not be a part of a rule, if it is clear what condition or target value the rule corresponds to. The rule antecedent will comprise a series of conjunctively joined terms, where each term is a logical expression including one or more operands operating on one or more columns (operands) and values thereof (if applicable). Each logical expression can be evaluated to a Boolean value. The rule antecedent can be applied to any row in the dataset to determine if the row is covered by the rule. The row is applied by plugging its values into the column operands and computing the Boolean value of the thusly-parameterized rule antecedent.

Regarding information in the presentation 204, including information about rules derived from post-rule processing can allow inclusion of additional contextual information. An example of this would be an additional column included with every rule that shows the distinct-count of items in a specific column not considered during rule induction. To use table 102 in FIG. 3 as an example, if location wasn't used for inducing rules, then alongside the rules and their target and total instances covered could be an extra column which displays the distinct-count of Locations, e.g., which are captured in that rule. This is useful if, for instance, there are hundreds of cities in the Location column but a rule's distinct-count of Locations is relatively small, say 2, meaning that specific rule is very accurate for those few cities but doesn't generalize well to the whole dataset. Usually, this would be addressed through a ranking algorithm which ensures that rules with the most instances and accuracy are the first presented but this would be another input to the ranking mechanism or user to ensure that the rule generalizes.

Although a modified version of the CN2 algorithm has been described above, the techniques can be applied to other sequential covering algorithms, for instance, the AQ and RIPPER algorithms. It should also be noted that the embodiments described above differ in how covering algorithms have been used previously. Previously, rule induction algorithms were trained with training data (data where the target values are known), and then the trained model would be applied to untrained data to classify the untrained according to the rules learned from the training data. The embodiments described herein differ in that the trained model is not used to categorize new non-training data. Rather, labeled/training data is passed to the rule induction algorithm, the rules are learned, and then the rules are outputted by the algorithm without even using the model on untrained data. Put another way, previous algorithms like CN2 have been used to predict a label (e.g., "yes to tennis") for a row and the actual rules have remained hidden and unused with respect to the data that generated the rules. Previous rule induction algorithms would not analyze the rules against the training data, whereas embodiments above recalculate each rule's target and total counts as well as accuracy according to the context of the original dataset (rules generated at the latter iterations only have the context of a subset of the data, so by recalculating these three items, each rule is shown to the end-user more accurately). Previous algorithms also had no reason to rank rules in terms of the data that generated the rules.

To further appreciate differences from typical rule-induction algorithms, consider that typically the models that rule-induction algorithms produce have a very specific ordering. This ordering is the order in which the rules are generated since the generation of each new rule removes a part of the dataset so the next rule cannot be evaluated until the first rule is determined to not fit the new data, since the next rule was induced without the context of the data that the first rule covered. Embodiments described herein need not adhere to this ordering since rules aren't being used for prediction. Because of this, once all rules have been learned, there may be one last pass through the dataset to recalculate the target and total instances covered as well as the accuracy for each rule within the context of the whole dataset instead of the subset that was used when it was generated. With the updated counts and accuracy, the rules can then be ranked according to their counts and accuracy so that the most accurate and highest count issues are at the top.

To summarize, embodiments involve the notion of using rule-learning machine learning models to find patterns within data which humans can then put to use. The embodiments speed up investigations by allowing computers to find the most important patterns which humans can then act on. Previously, rule-induction would be used in the "normal" machine-learning way of training the model on a training set of data then validating its accuracy and using that model to classify new points of data. In contrast, the embodiments herein are not for gaining generalized rules that can be applied outside of the current dataset. Instead, the embodiments aim to produce rules that explain the input data so that important patterns can be easily identified and acted on.

Figure 11:
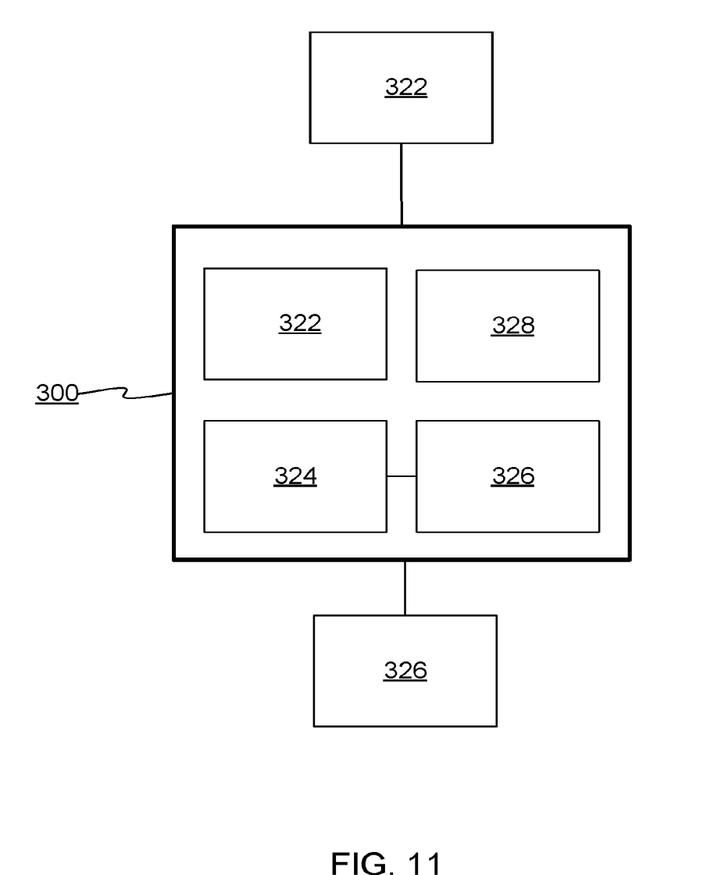
FIG. 11 shows details of a computing device.

FIG. 11 shows details of a computing device 300 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device or host 300 (possibly via cloud APIs) to implement the embodiments described herein.

The computing device or host 300 may have one or more displays 322, a network interface 324 (or several), as well as storage hardware 326 and processing hardware 328, which may be a combination of any one or more of: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter used thereby to read and/or store information. The hardware elements of the computing device or host 300 may cooperate in ways well understood in the art of machine computing. In addition, input devices may be integrated with or in communication with the computing device or host 300. The computing device or host 300 may have any form-factor or may be used in any type of encompassing device. The computing device or host 300 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A system comprising:
   processing hardware; and
   memory coupled to the processing hardware, the memory comprising computer executable instructions that, when executed, perform operations comprising:
      selecting a target dataset from a multi-dimensional dataset, the target dataset comprising target classes;
      generating a rule for each target class of the target classes by maintaining a beam of K-best rules for the target dataset, wherein each rule is accompanied by an indicator of at least a subset of the target dataset, a target count of instances representing the at least a subset of the target classes, a total count of instances representing the target dataset, and a count of instances not considered while generating the rule; and
      generating a set of rules comprising each rule, wherein the set of rules is ranked according to a total count of instances for each rule.

2. The system of claim 1, wherein the multi-dimensional dataset comprises columns and rows, the columns comprising the target classes.

3. The system of claim 1, wherein the generating the set of rules represents rule induction for the multi-dimensional dataset, the rule induction combining aspects of at least two of:
   a separate-and-conquer approach;
   a greedy heuristic; or
   a beam search algorithm.

4. The system of claim 3, wherein the separate-and-conquer approach:
   iteratively calculates and optimizes from a target value in the target dataset such that a particular rule is grown as the target dataset is reduced.

5. The system of claim 3, wherein the greedy heuristic:
   searches for a best combination of rule conditions;
   enumerates rule conditions for each target dataset of the multi-dimensional dataset;
   identifies a best rule condition of the rule conditions; and
   discards the rule conditions that are not the best rule condition.

6. The system of claim 3, wherein the beam search algorithm:
   searches for a best combination of rule conditions;
   enumerates rule conditions for each target dataset of the multi-dimensional dataset;
   identifies a K-best partial combinations of rule conditions; and
   discards the rule conditions that are not the K-best partial combinations.

7. The system of claim 3, wherein the rule induction comprises transforming a tabular structure of the multi-dimensional dataset to a logical structure of a decision tree.

8. The system of claim 1, wherein generating the set of rules comprises outputting text corresponding to each rule of the set of rules, each rule comprising one or more terms relating to the target dataset.

9. The system of claim 8, wherein each term of the one or more terms is a logical expression that includes one or more operands operating on one or more target datasets.

10. The system of claim 1, wherein each rule of the set of rules is a Boolean expression tree comprising operators or functions that test values in the target dataset and output Boolean values.

11. A method comprising:
   selecting a target dataset from a multi-dimensional dataset, the target dataset comprising target classes;
   generating a rule for each target class of the target classes by applying a greedy algorithm to the target dataset, wherein each rule is accompanied by an indicator of a subset of the target dataset, a total count of instances representing the target dataset, an accuracy for the rule, and a count of instances not considered while generating the rule; and
   generating a set of rules comprising each rule, wherein the set of rules is ranked according to the accuracy for each rule.

12. The method of claim 11, wherein the method is executed by a machine learning model to infer rules about the multi-dimensional dataset.

13. The method of claim 11, wherein the multi-dimensional dataset comprises one or more columns and one or more rows, the one or more columns indicating target datasets and the one or more rows comprising target classes for the target datasets.

14. The method of claim 13, wherein the greedy algorithm selects a best rule based on a quantity of instances of the target classes in the one or more rows.

15. The method of claim 13, wherein generating the rule comprises removing rows covered by the rule from the target dataset.

16. The method of claim 11, wherein each rule of the set of rules comprises one or more conditions specifying a value for a target class of a target dataset.

17. The method of claim 11, wherein the accuracy for each rule is expressed within a context of the multi-dimensional dataset as opposed to within a context of the target dataset.

18. The method of claim 11, wherein one or more rules is a logical expression that includes an operand.

19. The method of claim 11, wherein each rule is further accompanied by a total count of instances representing the target dataset.

20. A device comprising:
   processing hardware; and
   memory coupled to the processing hardware, the memory comprising computer executable instructions that, when executed, perform operations comprising:
      selecting a target column from a multi-dimensional dataset, the target column comprising target classes;

generating a rule for each target class of the target classes using a K-best rules approach for the target column, wherein each rule comprises an indicator of a target class, a count of rows comprising an instance of the target class in the target column, and a count of instances not considered while generating the rule; and generating a set of rules comprising each rule, wherein the set of rules is ranked according to a count of rows for each rule.

* * * * *